United States Patent
Park et al.

(10) Patent No.: US 11,677,929 B2
(45) Date of Patent: Jun. 13, 2023

(54) APPARATUS AND METHOD FOR DISPLAYING MULTI-DEPTH IMAGE

(71) Applicant: PJ FACTORY CO., LTD., Seoul (KR)

(72) Inventors: Jung Hwan Park, Seoul (KR); Jong Hyun Lee, Seoul (KR)

(73) Assignee: PJ FACTORY CO., LTD., Seoul (KR)

(*) Notice: Subject to any disclaimer, the term of this patent is extended or adjusted under 35 U.S.C. 154(b) by 57 days.

(21) Appl. No.: 17/282,892

(22) PCT Filed: Sep. 26, 2019

(86) PCT No.: PCT/KR2019/012492
§ 371 (c)(1),
(2) Date: Apr. 5, 2021

(87) PCT Pub. No.: WO2020/071684
PCT Pub. Date: Apr. 9, 2020

(65) Prior Publication Data
US 2021/0352268 A1 Nov. 11, 2021

(30) Foreign Application Priority Data
Oct. 5, 2018 (KR) ........................ 10-2018-0118728

(51) Int. Cl.
*H04N 13/351* (2018.01)
*H04N 13/122* (2018.01)
(Continued)

(52) U.S. Cl.
CPC .......... *H04N 13/351* (2018.05); *H04N 13/122* (2018.05); *H04N 13/183* (2018.05); *H04N 21/4316* (2013.01); *H04N 21/47202* (2013.01)

(58) Field of Classification Search
CPC ....... G06F 16/51; G06F 16/53; H04N 13/122; H04N 13/183; H04N 13/351;
(Continued)

(56) References Cited

U.S. PATENT DOCUMENTS

| 7,734,622 B1 | 6/2010 | Fitzhugh |
| 8,041,154 B2 | 10/2011 | Ohwa |

(Continued)

FOREIGN PATENT DOCUMENTS

| EP | 2 985 708 A1 | 2/2016 |
| JP | 2001-60202 A | 3/2001 |

(Continued)

OTHER PUBLICATIONS

Office Action dated Jun. 7, 2022 issued by the Japanese Patent Office in Japanese Application No. 2021-518524.

(Continued)

*Primary Examiner* — Farzana Hossain
(74) *Attorney, Agent, or Firm* — Sughrue Mion, PLLC

(57) ABSTRACT

A method is provided for displaying a multi-depth image in which one or more images are inserted into a main image in a tree structure and one or more objects are mapped to at least some of the one or more images. The method comprises generating at least one content tree from the tree structure of the multi-depth image; and configuring a display area corresponding to each of the at least one content tree. The display area includes a first area for displaying an image corresponding to each node of the content tree, and a second area for displaying an object corresponding to each node of the content tree or a playback user interface (UI) of the object. The first area and the second area respectively display the image and the object mapped thereto or the playback UI in synchronization with each other.

8 Claims, 10 Drawing Sheets

(51) Int. Cl.
*H04N 13/183* (2018.01)
*H04N 21/431* (2011.01)
*H04N 21/472* (2011.01)

(58) Field of Classification Search
CPC ........... H04N 21/4312; H04N 21/4316; H04N 21/47202; H04N 21/4722; H04N 21/4728; H04N 21/431; H04N 21/4302
See application file for complete search history.

(56) References Cited

U.S. PATENT DOCUMENTS

| | | | |
|---|---|---|---|
| 8,387,037 B2 | 2/2013 | Henseler et al. | |
| 8,629,918 B2 | 1/2014 | Takagi | |
| 11,263,477 B2 * | 3/2022 | Park | G06K 9/6268 |
| 11,354,028 B2 * | 6/2022 | Park | G06F 3/0486 |
| 2006/0242126 A1 * | 10/2006 | Fitzhugh | G06F 16/44 |
| 2008/0270444 A1 | 10/2008 | Brodie et al. | |
| 2011/0179390 A1 | 7/2011 | Morris | |
| 2017/0344199 A1 | 11/2017 | Taguchi et al. | |

FOREIGN PATENT DOCUMENTS

| | | |
|---|---|---|
| JP | 2003-112866 A | 4/2003 |
| JP | 5477176 B | 4/2014 |
| KR | 10-1387849 B1 | 4/2014 |
| KR | 10-2017-0135703 A | 12/2017 |

OTHER PUBLICATIONS

"Method of creating Yonai, web design, and an idea of interface design." MdN Corporation Co. Ltd., 2012, First edition, pp. 114-119 (8 pages total).

Extended European Search Report dated Jul. 11, 2022 in European Application No. 19869163.6.

International Search Report for PCT/KR2019/012492, dated Jan. 17, 2020.

* cited by examiner

APPARATUS AND METHOD FOR DISPLAYING MULTI-DEPTH IMAGE

CROSS-REFERENCE TO RELATED APPLICATION

This application is a National Stage of International Application No. PCT/KR2019/012492 filed Sep. 26, 2019, claiming priority based on Korean Patent Application No. 10-2018-0118728 filed Oct. 5, 2018, which is incorporated herein by reference in their entirety.

BACKGROUND

1. Field

The present invention relates to a multi-depth image display device and method, and more particularly, to a multi-depth image display device and method capable of selectively displaying a multi-depth image in one of a microblog format and a feed format.

2. Description of the Related Art

The statements in this section merely provide background information related to the present disclosure and do not necessarily constitute prior art.

A multi-depth image refers to an image of a new format in which one or more other images (hereinafter referred to as 'sub images') that provide additional information are inserted into one basic image (hereinafter referred to as a 'main image'). The multi-depth image helps a user to easily obtain a detailed image in a small screen portable electronic device such as a smart phone.

On the other hand, since it is difficult to accurately convey the specific contents of each image constituting a multi-depth image, it is necessary to effectively transmit information to the user by displaying the corresponding image on a display screen together with various objects such as text and video.

In addition, since the user's interest rank or degree of interest on a specific subject may be different for each user, it is necessary to modify the display order of the multi-depth images to suit the user's preference.

SUMMARY

Based on this need, the present embodiment provides a multi-depth image display device and method capable of enhancing user convenience by displaying a multi-depth image on a display screen in a microblog format or a feed format according to a user's selection.

In accordance with one aspect of the present disclosure, a method is provided for displaying a multi-depth image in which one or more images are inserted into a main image in a tree structure and one or more objects are mapped to at least some of the one or more images. The method comprises generating at least one content tree from the tree structure of the multi-depth image; and configuring a display area corresponding to each of the at least one content tree. The display area includes a first area for displaying an image corresponding to each node of the content tree, and a second area for displaying an object corresponding to each node of the content tree or a playback user interface (UI) of the object. The first area and the second area respectively display the image and the object mapped thereto or the playback UI in synchronization with each other.

In accordance with one aspect of the present disclosure, a multi-depth image display device is provided. The apparatus comprises a tree structure configuration unit configured to generate a multi-depth image by inserting one or more images into a main image in a tree structure and map one or more objects to at least some of the one or more images; a display area setting unit configured to generate at least one content tree from the tree structure of the multi-depth image and constitute a display area corresponding to each of said the at least one content tree; and a display unit configured to display the multi-depth image in the display area. The display area comprises a first area for displaying an image corresponding to each node of the content tree, and a second area for displaying an object corresponding to each node of the content tree or a playback user interface (UI) of the corresponding object in synchronization with the image being displayed in the first area. The display unit displays the image and the object mapped thereto or the playback UI of the object on the first area and the second area, respectively.

The device and method for displaying a multi-depth image according to the present embodiment displays a multi-depth image in a microblog format or a feed format according to a user's selection, so that there is an effect that may improve user convenience and information delivery power.

In addition, the multi-depth image display device and method according to the present embodiment allows a user to arbitrarily change the layer order of a preset multi-depth image, so that it has the effect of enabling user-customized information delivery.

The effect of the present invention is not limited to the above-described effects, and other effects that are not mentioned may be apparently derived from the following description to a person skilled in the art.

DETAILED DESCRIPTION

Figure 1:
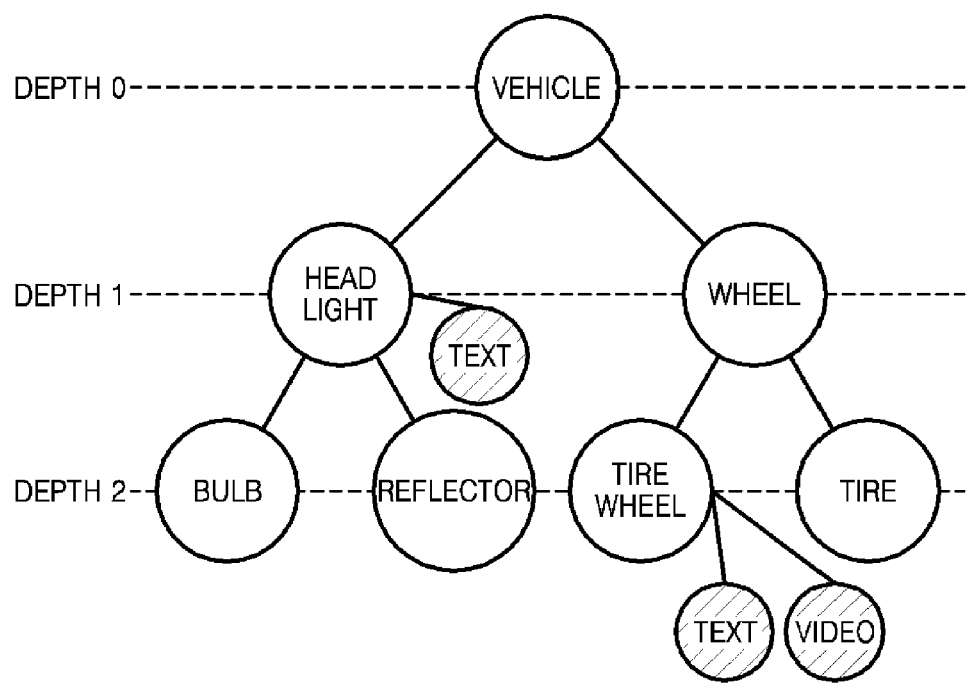
FIG. 1 is an exemplary diagram showing a tree structure of a multi-depth image.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to units for processing at least one function or operation, which may be implemented by hardware, software, or a combination thereof.

Hereinafter, some embodiments of the present disclosure will be detailed with reference to the accompanying drawings FIG. 1 is an exemplary diagram showing a tree structure of a multi-depth image.

Referring to FIG. 1, a multi-depth image may be configured as one main image and a plurality of sub images. A plurality of images of a multi-depth image may be hierarchized considering a specific subject or context, and then configure nodes to form a single tree structure. In this case, the main image may be inserted into the root node of the tree structure, and the sub images may be inserted into the lower-level nodes, respectively.

FIG. 1 shows an exemplary tree structure of a multi-depth image based on a vehicle. Specifically, an image representing the entire exterior of the vehicle is inserted into the root node as the main image. Images of headlights and wheels, which are components of the vehicle, are inserted as sub images into nodes of level 1, which are child nodes of the root node. In this case, images of bulbs and reflectors, which are components of the headlight, are inserted as sub images into nodes of level 2, which are child nodes of the headlight node. In addition, images of tires and tire wheels, which are components of the wheel, are inserted as sub images into nodes of level 2, which are child nodes of the wheel node. As a result, the headlight node and the wheel node are located under the vehicle node, the bulb node and the reflector node are located under the headlight node, and the tire node and the tire wheel node are located under the wheel node. And, in this way, a plurality of sub images may be continuously inserted into each lower-level node of the tree structure.

The multi-depth image is an image format in which an object of a child node is inserted into an object of a parent node in the tree structure illustrated in FIG. 1. When an object of a child node is inserted into an object of a parent node, the inserted object is generally an image. However, in addition to the image, video, text, audio, links to other files, Internet address links, bookmarks, 360 images, and various objects such as 3D objects may be inserted into the object of the parent node as the object of the child node. Hereinafter, the present embodiment will be described on the premise that all objects inserted into each node of the multi-depth image are images. However, it should be noted that this is for convenience of description and does not limit the present embodiment.

In the tree structure illustrated in FIG. 1, by inserting the image of the child node (hereinafter, referred to as 'child image') at the appropriate position of the image of the parent node (hereinafter referred to as 'parent image'), it is possible to generate multi-depth images. As a method of inserting a child image in the proper position of the parent image, a method of inserting the child image in the position where the features of the child image are found in the parent image after comparing the parent image and the child image may be used.

In the tree structure of the multi-depth image, multimedia content may be additionally mapped to each node. Here, the multimedia content is digital content related to an image inserted in each node, and may include various types of objects such as text, video, and audio. For example, in the tree structure of FIG. 1, text indicating specification information such as manufacturer, luminance, and lifetime may be mapped to a headlight node. Text representing specification information such as material and manufacturing method may be mapped to the tire wheel node. In addition, video indicating the shape of the tire wheel during vehicle driving may be additionally mapped to the tire wheel node. In each case, the image inserted in each node and the multimedia content mapped thereto may be synchronized with each other and displayed in different areas, and this will be described in detail later.

In the tree structure of the multi-depth image, each component image and related multimedia content may be inserted or mapped to each node using various methods such as a drag-and-drop method or an input method using a file explorer.

Figure 2:
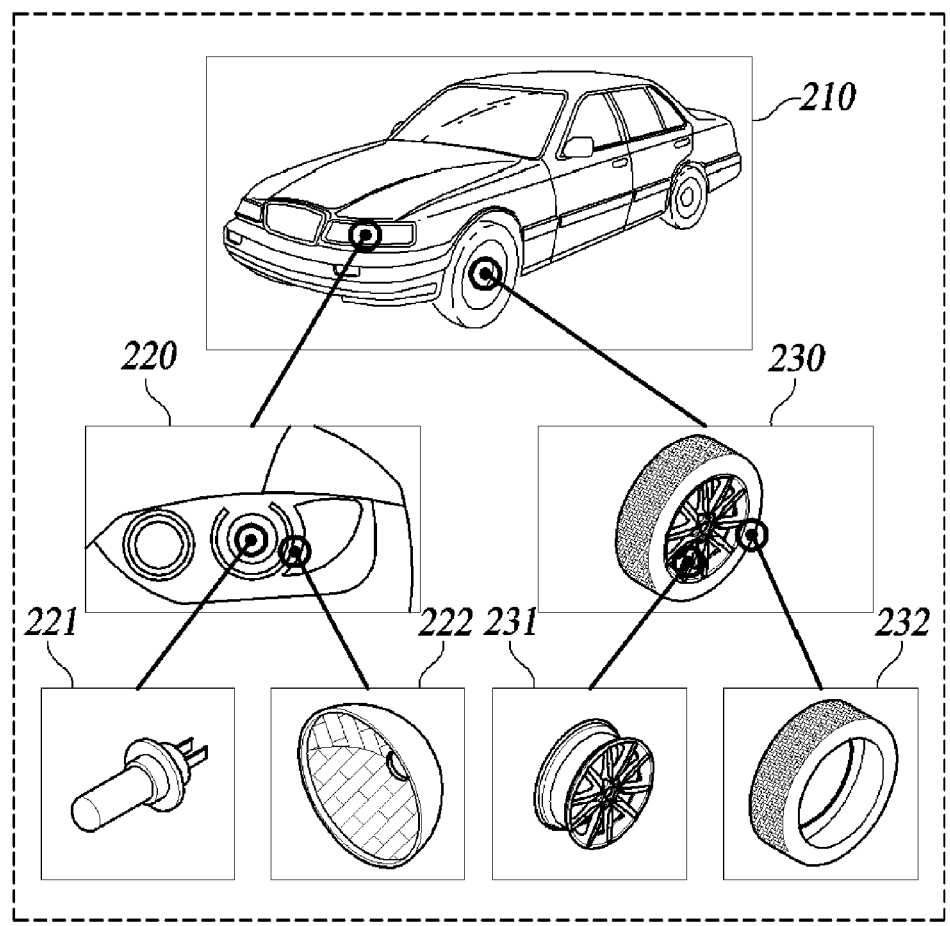
FIG. 2 is an exemplary view showing actual images constituting a multi-depth image.

FIG. 2 is an exemplary view showing actual images constituting a multi-depth image.

Referring to FIG. 2, the multi-depth image 200 for the vehicle may include an entire vehicle image 210, a headlight image 220, a bulb image 221, a reflector image 222, a wheel image 230, a tire wheel image, and a tire image 232.

When clicking or touching an icon indicating that another image is inserted in each image (a '⊙'-shaped icon in FIG. 2), the inserted image may be displayed.

As shown in FIG. 2, in relation to a multi-depth image, the headlight image 220 is inserted at the position where a feature similar to that of the headlight image 220 is found in the entire vehicle image 210, and the wheel image 230 is inserted at a position where a feature similar to that of the wheel image 230 is found in the entire vehicle image 210. In relation to the multi-depth image, the bulb image 221 is inserted at the position where a feature similar to that of the bulb image 221 is found in the headlight image 220, and the reflector image 222 is inserted at the position where a feature similar to that of the reflector image 222 is found in the headlight image 220. Also, in relation to the multi-depth image, the tire wheel image 231 is inserted at the position where a feature similar to that of the tire wheel image 231 is found in the wheel image 230, and the tire image 232 is inserted at the position where a feature similar to that of the tire image 232 is found in the wheel image 230. However, it is not always necessary to insert the child image at the position where the feature of the child image is found in the parent image, and as long as the child image is inserted anywhere in the parent image, it becomes a multi-depth image.

Hereinafter, a multi-depth image display device and a display method according to an exemplary embodiment will be described in detail with reference to the accompanying drawings.

Figure 3:
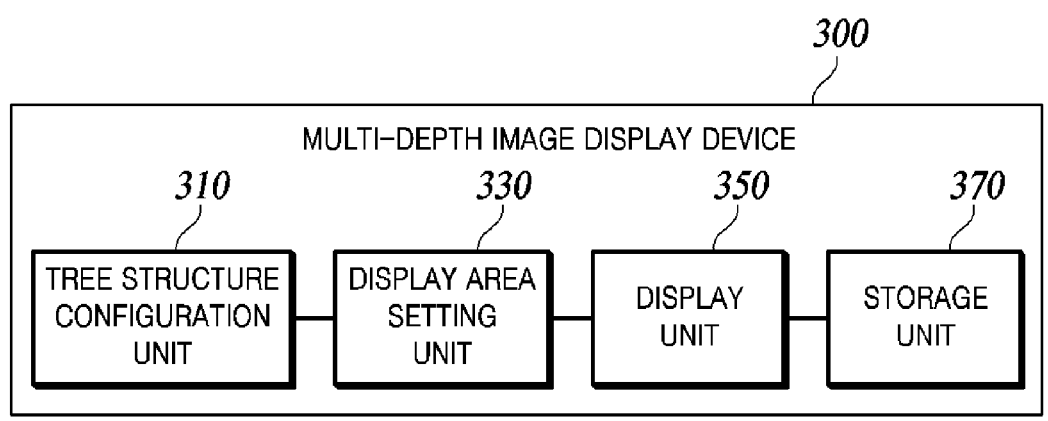
FIG. 3 is a block diagram showing the configuration of a multi-depth image display device according to the present embodiment.

FIG. 3 is a block diagram showing the configuration of a multi-depth image display device according to the present embodiment.

Referring to FIG. 3, the multi-depth image display device 300 may include a tree structure configuration unit 310, a display area setting unit 330, and a display unit 350. In addition, the multi-depth image display device 300 may further include a storage unit 370. Here, the tree structure configuration unit 310, the display area setting unit 330, and the display unit 350 may each constitute a separate module or constitute a plurality of modules in which each function is merged, and may be implemented as hardware or software, or may be implemented as a combination of both.

The tree structure configuration unit 310 may configure a tree structure using a plurality of images constituting a multi-depth image and multimedia content corresponding to each image. Specifically, the tree structure configuration unit 310 may insert the main image of the multi-depth image into a root node, and hierarchically insert the sub images of the multi-depth image into the lower-level nodes of the root node, respectively. In addition, the tree structure configuration unit 310 may map multimedia content input from a user to each node into which component images of a multi-depth image are inserted. Here, the multimedia content is digital content related to images inserted in each node, and may include various types of objects such as text and audio/video. An example of a tree structure for a multi-depth image configured by the tree structure configuration unit 310 is as described above with reference to FIGS. 1 and 2.

After generating one or more content trees from the tree structure of the multi-depth image, the display area setting unit 330 may set one or more display areas based on the generated content tree.

The display area setting unit 330 may configure one or more content trees from a tree structure of multi-depth images. For example, the display area setting unit 330 may configure one content tree including all nodes and connection relationships in a tree structure related to a multi-depth image as it is. Alternatively, after dividing the basic tree structure for a multi-depth image into a plurality of subtrees, the display area setting unit 330 may configure a plurality of content trees from each subtree generated by division.

The display area setting unit 330 may set a display area for displaying a multi-depth image and related multimedia content by using the configured content tree. A display area for displaying a multi-depth image and related multimedia content is as shown in FIG. 4.

Figure 4:
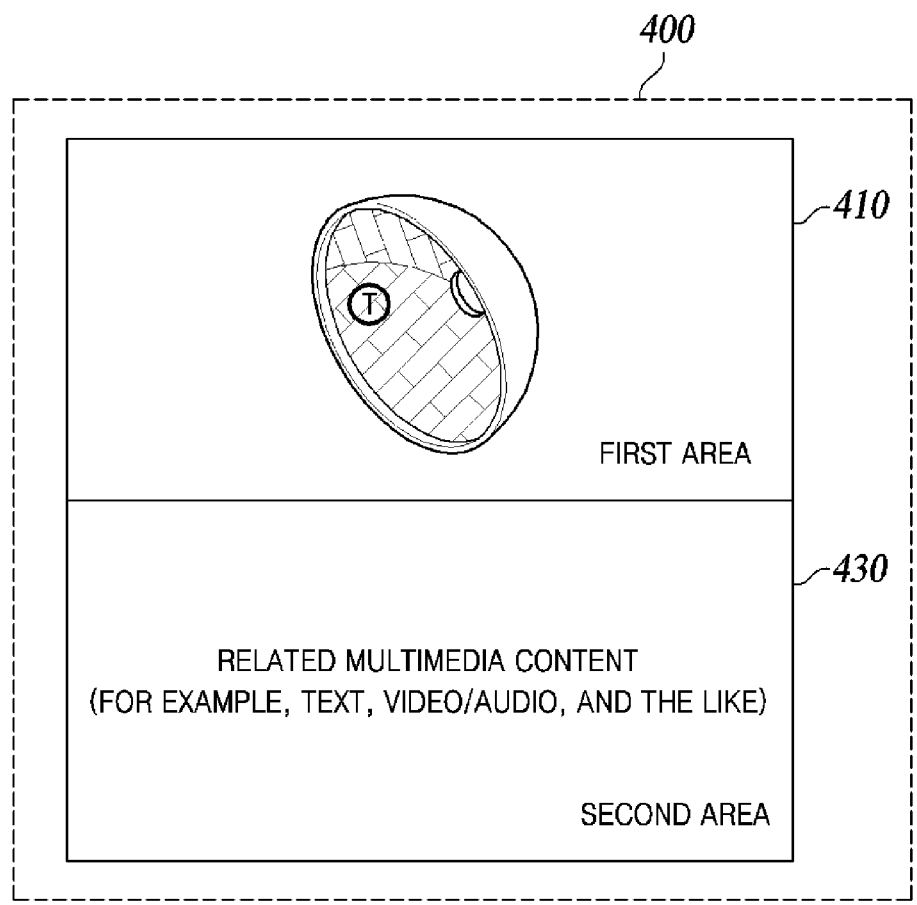
FIG. 4 is a diagram illustrating a display area of a multi-depth image.

FIG. 4 is a diagram illustrating a display area of a multi-depth image.

Referring to FIG. 4, a display area 400 of a multi-depth image may include a first area 410 for displaying an image and a second area 430 for displaying multimedia content mapped to the image.

A plurality of images constituting a multi-depth image may be displayed in the first area 410. For example, in the initial state without the user's special action (e.g., clicking the image insertion icon in the multi-depth image), in the first area 410, a main image inserted into a root node of a multi-depth image may be displayed. In addition, when any one of the sub images inserted into the lower-level node of the multi-depth image is selected by clicking or touching an icon of the user, the selected sub image may be displayed in the first area 410. The component image of the multi-depth image displayed in the first area 410 may be enlarged or reduced through a user's clicking a detail icon or a mouse wheel operation. In FIG. 4, the '⊙T' icon of the image displayed in the first area 410 indicates a detail icon for expanding or reducing the image.

In the second area 430, multimedia content corresponding to the image displayed in the first area 410 may be displayed in synchronization with the corresponding image. In this case, the multimedia content may include various objects such as text and video mapped to an image node, as described above with reference to FIG. 1.

When the multimedia content is text, the text may be synchronized with the image of the first area 410 and displayed using a scroll method or the like in the second area 430.

When the multimedia content is video/audio, a playback user interface (UI) such as a player or controller for playing the video/audio may be displayed in synchronization with the image of the first area 410 in the second area 430. In this case, the video may be overlaid on the display area 400 at an arbitrary position among the entire display screen of the multi-depth image and played, and the corresponding audio may be played in the background. In each case, the user may control (e.g., pause, stop, etc.) the playback of the corresponding video or audio using the playback UI displayed on the second area 430.

The display area setting unit 330 may set a display area for displaying multi-depth images and related multimedia contents as many as the number of configurations of the content tree. That is, when n content trees are configured from a tree structure related to a multi-depth image, the display area setting unit 330 may set n display areas. Each of the n display areas includes a first area and a second area. Here, n is an integer of 1 or more. An example of setting a display area according to whether a tree structure for a multi-depth image is divided is as shown in FIGS. 5A and 5B.

Figure 5A:
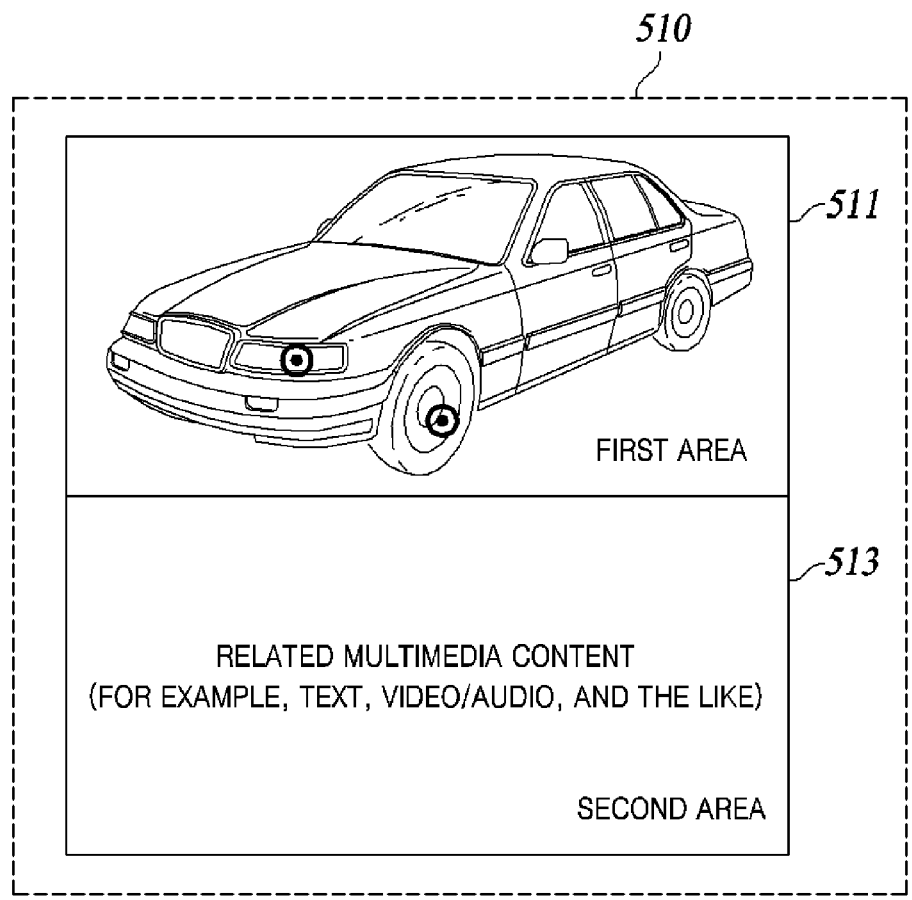
FIG. 5A is a diagram illustrating a display area when a tree structure of a multi-depth image is not divided.
Figure 5B:
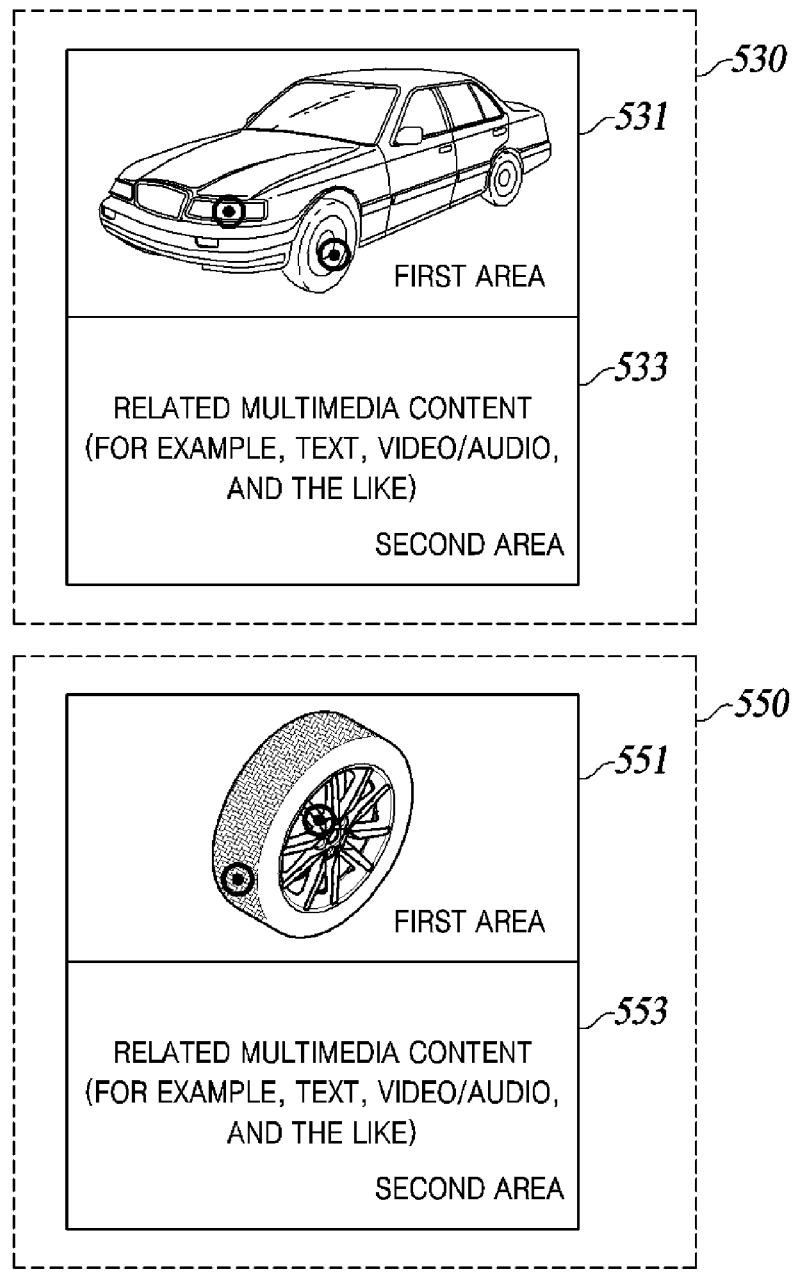
FIG. 5B is a diagram illustrating a display area when a tree structure of a multi-depth image is divided.

FIG. 5A is a diagram illustrating a display area when a tree structure of a multi-depth image is not divided, and FIG. 5B is a diagram illustrating a display area when a tree structure of a multi-depth image is divided.

Referring to FIG. 5A, when the tree structure of the multi-depth image is not divided, the display area 510 of the multi-depth image may be configured as one area including the first area 511 and the second area 513. In the first area 511, all images constituting the multi-depth image may be displayed in the order of specific sub images according to a user's selection starting from the main image. In addition, multimedia content (e.g., text, video, etc.) synchronized with the image of the first area 511 may be displayed in the second area 513. When a sub image of a multi-depth image is displayed in the first area 511, in at least one of the first area 511 and the second area 513, a backward menu (not shown), for example, a backward icon, for returning to an higher-level topic (i.e., a root node or a branch node of a tree structure) in the multi-depth image may be displayed.

Referring to FIG. 5B, when the tree structure of a multi-depth image is divided into a plurality of content trees, the display areas 530 and 550 of the corresponding multi-depth image may include first areas 531 and 551 and second areas 533 and 553, respectively. As in the case of FIG. 5A, component images inserted into nodes of each subtree generated by tree division are displayed in the first areas 531 and 551, and multimedia contents corresponding to the images displayed in the first areas 531 and 551 may be displayed in the second areas 533 and 553 in synchronization with the images of the first areas 531 and 551. In addition, when component images inserted into lower-level nodes of each subtree are displayed in the first areas 531 and 551, in at least one of the first areas 531 and 551 and the second areas 533 and 553, a backward icon (not shown) for returning to an higher-level topic (i.e., a root node or a branch node of a corresponding subtree) in the corresponding subtree may be displayed. Each of the display areas 530 and 550 is sequentially displayed. When all of the display areas 530 and 550 are not displayed on one screen, the user may sequentially check the respective display areas through screen scrolling. When a plurality of display areas are generated as the tree structure of a multi-depth image is divided into a plurality of content trees, a method of determining a display order among the display areas will be described later.

Figure 6:
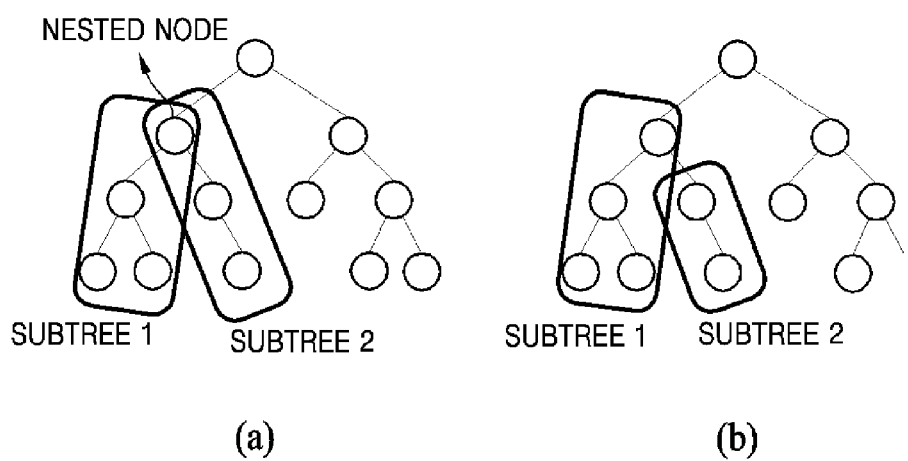
FIG. 6 is an exemplary diagram showing a division form of a tree structure for a multi-depth image.

A method of dividing the tree structure of a multi-depth image is as shown in FIG. 6.

FIG. 6 is an exemplary diagram showing a division form of a tree structure for a multi-depth image.

Referring to FIG. 6, a tree structure of a multi-depth image may be divided into a plurality of sub-trees based on a branch node. At this time, the tree structure may be divided into overlapping subtrees that share branch nodes as shown in (a) of FIG. 6, or divided based on branch nodes so that they do not overlap with each other as shown in (b) of 6.

Alternatively, the tree structure of the multi-depth image may be divided by the user. For example, a tree structure of a multi-depth image may be divided in a manner desired by a user, not a branch node. Alternatively, a plurality of subtrees divided based on a branch node may be integrated with each other or further divided according to a user's selection. The division information is mapped with the corresponding multi-depth image information and stored in the storage unit 370, for example, a nonvolatile memory, so that the division information may be used when displaying the same image again in the future.

Returning to FIG. 3 again, the display unit 350 may display a component image of a multi-depth image and related multimedia content in a display area set by the display area setting unit 330. Specifically, the display unit 350 may sequentially display component images corresponding to each node of the content tree, that is, from the main image to the sub image, in the first area of the display area.

According to an aspect of the present embodiment, the display unit 350 may display component images of a content tree in a first area of the display area in a depth first search method. Typically, multi-depth images have a story and are generated in a tree structure. A causal relationship exists between the higher-level node and the lower-level node. On the other hand, nodes that exist at the same depth in the tree structure have a story of an equal relationship rather than a story of a causal relationship. Therefore, when displaying component images of the content tree in the first area by breadth first search, the texts in the second area displayed in synchronization with the first area do not have a causal relationship, resulting in unnatural story development. Therefore, this embodiment uses a depth first search method.

Also, the display unit 350 may determine the display order of the component branches of the corresponding content tree based on at least one of the number of depths of each branch of the content tree, the generation time of the image or text included in each branch, and the number of related keywords searched from the text included in each branch. For example, when a specific content tree is configured as two branches, the display unit 350 may display images inserted into nodes of a branch having a large depth number among the corresponding branches in the first area before other branches. Also, when a specific content tree is configured as two branches, the display unit 350 may display images inserted into nodes of a branch having a large number of related keywords of texts included in the corresponding branches in the first area before other branches. However, it should be noted that this is exemplary and the present embodiment is not limited thereto. That is, the display unit 350 may display images inserted into nodes of a branch having a small number of related keywords among the constituent branches of a specific content tree in the first area before other branches.

The order of displaying images in the first area set by the display area setting unit 330 may be arbitrarily changed according to a user's selection. For example, the user may change the display order of a plurality of branches constituting the content tree or the order of nodes included in each branch, so that the order of image display in the first area may be arbitrarily changed.

The display unit 350 may display multimedia content (e.g., text, video, etc.) related to a component image displayed in the first area in a second area of the display area in synchronization with a corresponding component image.

Figure 7A:
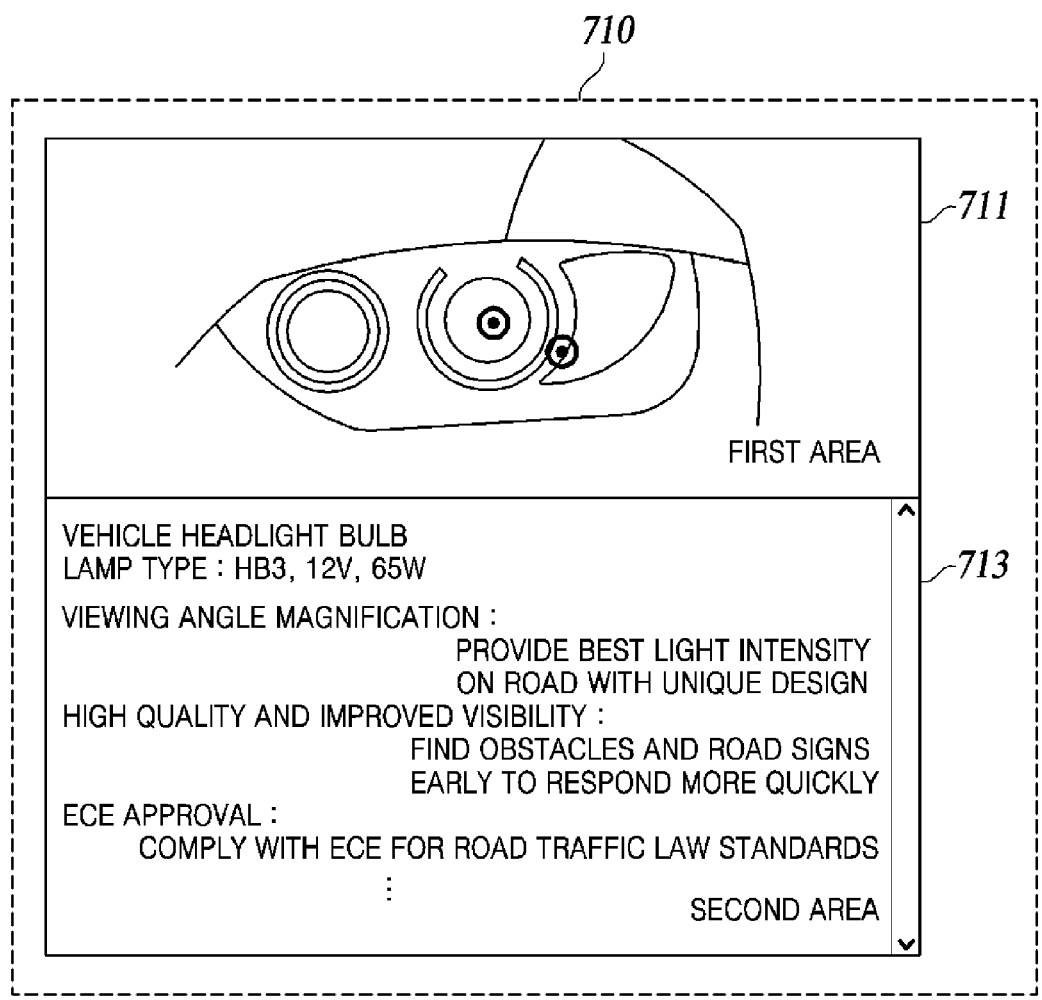
FIG. 7A is an exemplary view showing a display format when text is mapped to a node of a multi-depth image.

When the multimedia content to be displayed is text, the text may be displayed in a scrolling method in the second area of the display area, and a specific example thereof is as shown in FIG. 7A. Referring to FIG. 7A, a component image of a multi-depth image may be displayed in the first area 711 of the display area 710. In addition, in the second area 713, the text mapped to the image displayed in the first area 711 may be synchronized with the image in the first area 711 and displayed using a scroll method.

Figure 7B:
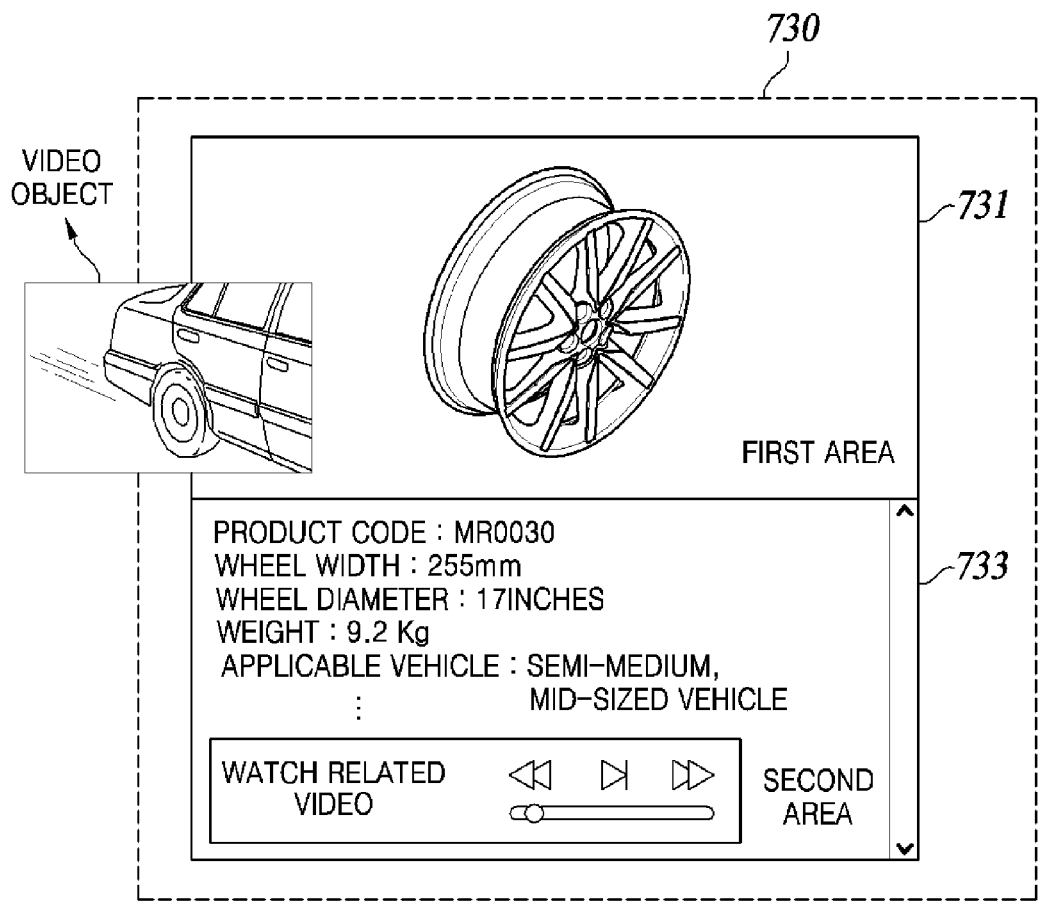
FIG. 7B is an exemplary view showing a display format when video is mapped to a node of a multi-depth image.

If the multimedia content to be displayed is video/audio, a playback user interface (UI) such as a player or controller for playing the video/audio may be displayed in the second area of the display area, and a specific example thereof is as shown in FIG. 7B. Referring to FIG. 7B, a component image of a multi-depth image may be displayed in the first area 731 of the display area 730. In addition, a player used to play a video mapped to an image displayed in the first area 731 may be displayed in the second area 733. In this case, the video may be overlaid on the display area 733 at an arbitrary position among the entire display screen of the multi-depth image and played.

The storage unit 370 is a component necessary to map division information of a multi-depth image with corresponding image information and store the information, and may include a non-volatile memory (e.g., NAND flash memory) or a volatile memory (e.g., DRAM).

Division information, such as whether a tree structure for a multi-depth image is divided and the number of divisions, may be mapped to the corresponding multi-depth image information and stored in the storage unit 370 and then used for the next image display.

On the other hand, when the tree structure of a multi-depth image is divided into a plurality of content trees, the display order of content trees is determined based on the depth (level) occupied by the tree structure of the multi-depth image. In the tree structure of the multi-depth image, the display area of the content tree occupying the higher-level depth is displayed first. However, content trees having the same depth may exist. For example, content trees branching from the same branch node to the lower-level may be classified as the same depth because the depth of the parent node is the same. The display order of the display areas of the content trees branching from the same branch node to the lower-level may be determined based on one or more of the following (1) The number of depths (levels) of each of the content trees branched to the lower-level, (2) Time when the image or text included in the content trees branching to the lower-level is generated (3) The number of related keywords searched from texts included in each of the content trees branching to the lower-level Of course, as described above, the display order of the display areas of each content tree may be changed according to the user's selection.

Figure 8:
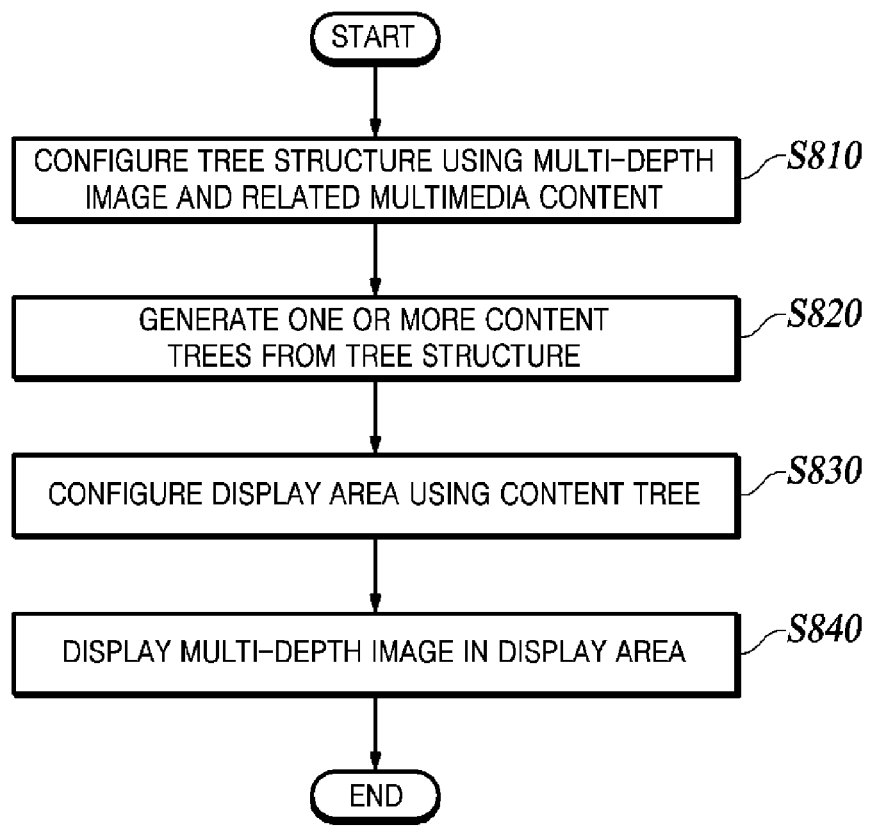
FIG. 8 is a flowchart illustrating a method of displaying a multi-depth image according to the present embodiment.

FIG. 8 is a flowchart illustrating a method of displaying a multi-depth image according to the present embodiment.

Referring to FIGS. 3 and 8, in operation S810, the tree structure configuration unit 310 may configure a tree structure using a plurality of images constituting a multi-depth image and multimedia content corresponding to each image. The main image and sub image of the multi-depth image are hierarchically inserted in each node of the tree structure, and multimedia content related to the image, for example, various types of objects such as text and audio/video may be mapped to each node into which an image is inserted.

In operation S820, the display area setting unit 330 may generate one or more content trees from a tree structure of a multi-depth image.

When the tree structure of the multi-depth image is divided into n subtrees (where n is an integer greater than or equal to 1), and thus a plurality of content trees are generated, two or more content trees may share one branch node. That is, the tree structure may be divided into nested subtrees that share a branch node, and may be divided into non-nested subtrees that do not share a branch node. The tree structure of the multi-depth image may be pre-divided by the user before the image is shown in the display area and the division information is mapped with the corresponding multi-depth image information and stored in the storage unit 370, for example, a nonvolatile memory, so that it may be used again when displaying the same image in the future.

In operation S830, the display area setting unit 330 may configure one or more display areas by using the content tree generated in operation S820. Here, each display area may include a first area for displaying an image and a second area for displaying multimedia content related to the image.

In detail, the display area setting unit 330 may configure one content tree including all nodes and connection relationships in a tree structure related to a multi-depth image as it is. In this case, the display area setting unit 330 may set one display area for displaying a multi-depth image.

In addition, after dividing the basic tree structure for a multi-depth image into n subtrees (where n is an integer greater than or equal to 1), the display area setting unit 330 may configure each subtree generated by division as a separate content tree. In this case, the display area setting unit 330 may set n number of display areas for displaying a multi-depth image.

In operation S840, the display unit 350 may display a multi-depth image in the display area set in operation S830. Specifically, the display unit 350 may display a component image of a multi-depth image in a first area of each display area, and display in the second area of each display area the multimedia content mapped to the image displayed in the first area in synchronization with the first area.

When the multimedia content is text, the text may be synchronized with the image of the first area 410 and displayed using a scroll method or the like in the second area 430.

When the multimedia content is video/audio, a playback user interface (UI) such as a player or controller for playing the video/audio may be displayed in synchronization with the image of the first area 410 in the second area 430. In this case, the video may be overlaid on the display area 400 at an arbitrary position among the entire display screen of the multi-depth image and played, and the corresponding audio may be played in the background. In each case, the user may control (e.g., pause, stop, etc.) the playback of the corresponding video or audio using the playback UI displayed on the second area 430.

As above, in FIG. 8, although it is described that a plurality of processes are sequentially performed, this is merely illustrative of the technical idea of the present embodiment. In other words, for those of ordinary skill in the technical field to which this embodiment belongs, without departing from the essential characteristics of this embodiment, by changing the order shown in FIG. 8 or performing some of the plurality of processes in parallel, it will be possible to apply various modifications and changes, so that FIG. 8 is not limited to a time series order.

Meanwhile, the processes shown in FIG. 8 may be implemented as computer-readable codes on a computer-readable recording medium. The computer-readable recording medium includes all types of recording devices that store data that may be read by a computer system. That is, the computer-readable recording medium includes a storage medium such as a magnetic storage medium (e.g., ROM, floppy disk, hard disk, etc.), and an optical reading medium (e.g., CD-ROM, DVD, etc.). In addition, the computer-readable recording medium may be distributed over a computer system connected through a network to store and execute computer-readable codes in a distributed manner.

Meanwhile, in the above, it has been described that when the displayed image in the first area is changed, text corresponding to the image is displayed in synchronization in the second area, but vice versa. For example, when text displayed in the second area is changed through scrolling, an image corresponding to the changed text may be displayed in synchronization with the first area.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method of displaying a multi-depth image in which one or more images are inserted into a main image in a tree structure and one or more objects are mapped to at least some of the one or more images, wherein the multi-depth image is an image format in which an image of a child node in the tree structure is inserted at a specific location within an image of a parent node, and the image of the child node is newly displayed upon selecting the specific location within the image of the parent node that is currently being displayed, the method comprising:

generating at least one content tree from the tree structure of the multi-depth image, wherein the at least one content tree is a single tree identical to the tree structure of the multi-depth image, or is a plurality of sub-trees divided from the tree structure of the multi-depth image; and configuring a display area corresponding to each of the at least one content tree, wherein the display area includes a first area for displaying an image corresponding to each node of the content tree, and a second area for displaying, in a scrollable manner, an object corresponding to each node of the content tree or a playback user interface (UI) of the object, wherein objects corresponding to nodes of the content tree or playback UIs of the objects are arranged on the second area according to a depth first search order, wherein the first area and the second area respectively display the image and the object mapped thereto or the playback UI of the object in synchronization with each other, wherein, when a current image displayed on the first area is changed to a child image thereof in response to a user input for selecting a location, in the current image, at which the child image thereof is inserted, an object mapped to the child image thereof is displayed on the second area, and wherein, when an object displayed on the second area is changed though scrolling, an image mapped to the changed object is displayed on the first area.

2. The method of claim 1, wherein the at least content tree is the single tree, and a display order of a plurality of branches branching from a same branch node of the single tree is determined based on at least one of: a number of levels of each of the plurality of branches, a time when images or objects included in the plurality of branches are generated, and a number of associated keywords searched from objects included in each of the plurality of branches.

3. The method of claim 2, wherein the display order of the plurality of branches branching from the same branch node of the single tree is changeable by changing positions of the plurality of branches or changing an order of nodes included in each of the plurality of branches, according to a user's selection.

4. The method of claim 1, wherein the at least content tree is the plurality of sub-trees, and the plurality of sub-trees are non-nested subtrees generated by dividing the tree structure of the multi-depth image based on branch nodes.

5. The method of claim 1, wherein the display area of a sub-tree occupying a higher-level in the tree structure of the multi-depth image among the plurality of sub-trees is displayed first.

6. The method of claim 5, wherein a display order of the display areas corresponding to sub-trees branching from the same branch node to a lower-level among the plurality of sub-trees is determined based on at least one of:
- a number of levels of each of the content trees branched to the lower-level,
- a time when an image or text included in content trees branching to the lower-level is generated, and
- a number of related keywords searched from texts included in each of the content trees branching to the lower-level.

7. The method of claim 6, wherein a display order of the sub-trees branching from the same branch node to a lower-level is changeable by changing positions of the sub-trees or changing an order of nodes included in each of the sub-trees according to a user's selection.

8. A non-transitory computer-readable recording medium on which a program is recorded, the program when executed by a computer system cause a method of claim 1.

* * * * *